Aug. 10, 1926.　　　　　　　　　　　　　　　　　　　　1,595,925
E. A. RADNALL
VELOCIPEDE
Filed Dec. 31, 1925　　　　3 Sheets-Sheet 1

Aug. 10, 1926.

E. A. RADNALL

VELOCIPEDE

Filed Dec. 31, 1925

1,595,925

3 Sheets-Sheet 2

Inventor
Ernest Arnold Radnall

Aug. 10, 1926.
E. A. RADNALL
1,595,925
VELOCIPEDE
Filed Dec. 31, 1925   3 Sheets-Sheet 3
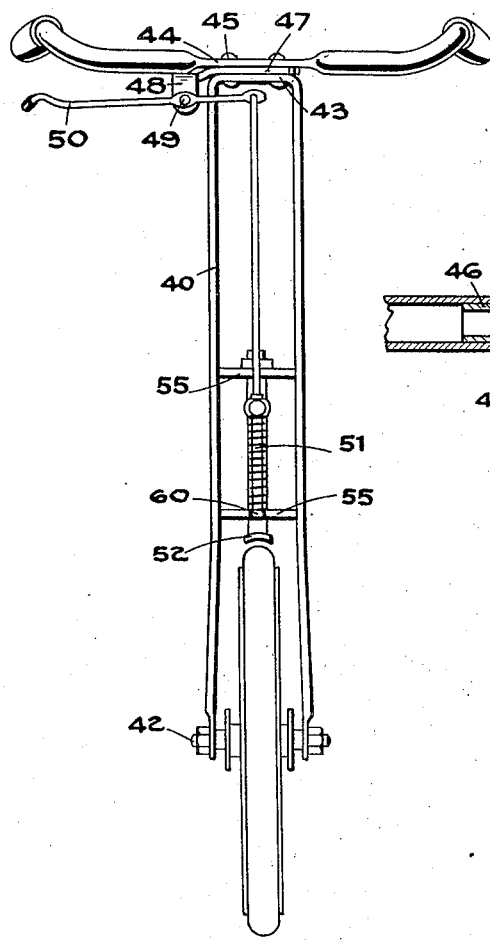
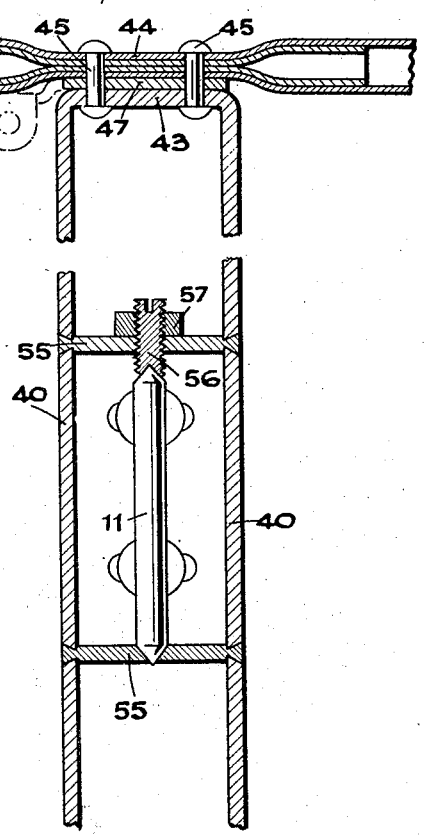

Patented Aug. 10, 1926.

1,595,925

UNITED STATES PATENT OFFICE.

ERNEST ARNOLD RADNALL, OF BIRMINGHAM, ENGLAND.

VELOCIPEDE.

Application filed December 31, 1925, Serial No. 78,644, and in Great Britain January 28, 1925.

This invention relates primarily to children's cycles, and has for its object to provide an improved or simplified construction of front fork, handle bar, and associated parts whereby a light and strong frame having an attractive appearance can be produced at relatively low cost.

It is to be understood, however, that features of the invention are applicable to other forms of velocipedes, for example, adult's cycles or children's scooters of the kind having a platform on which the child places one or both feet, and either with or without a supported saddle or seat.

A preferred embodiment of the invention is illustrated by way of example in the accompanying drawings which show a child's cycle, and in which—

Figure 1:
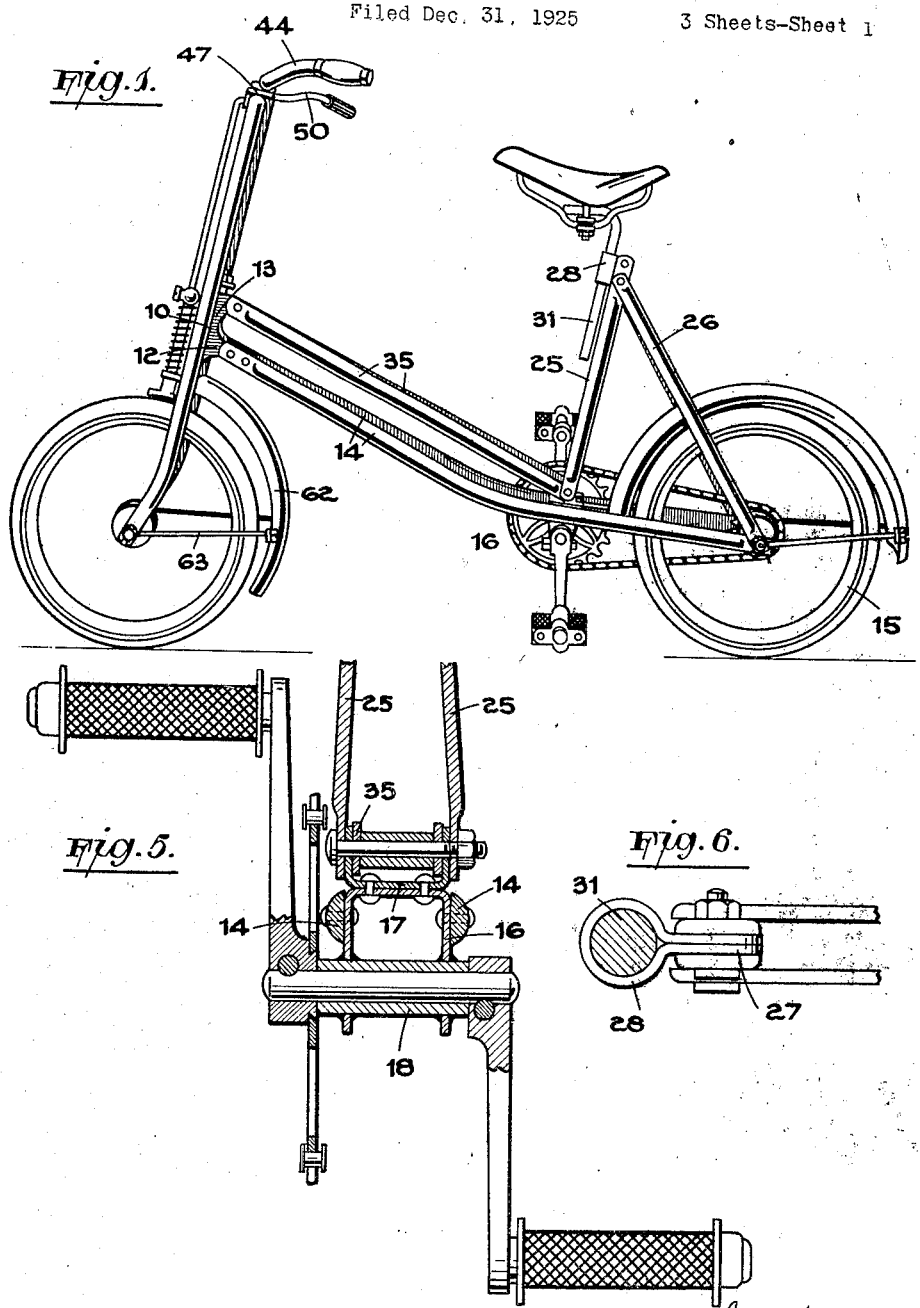
Figure 2:
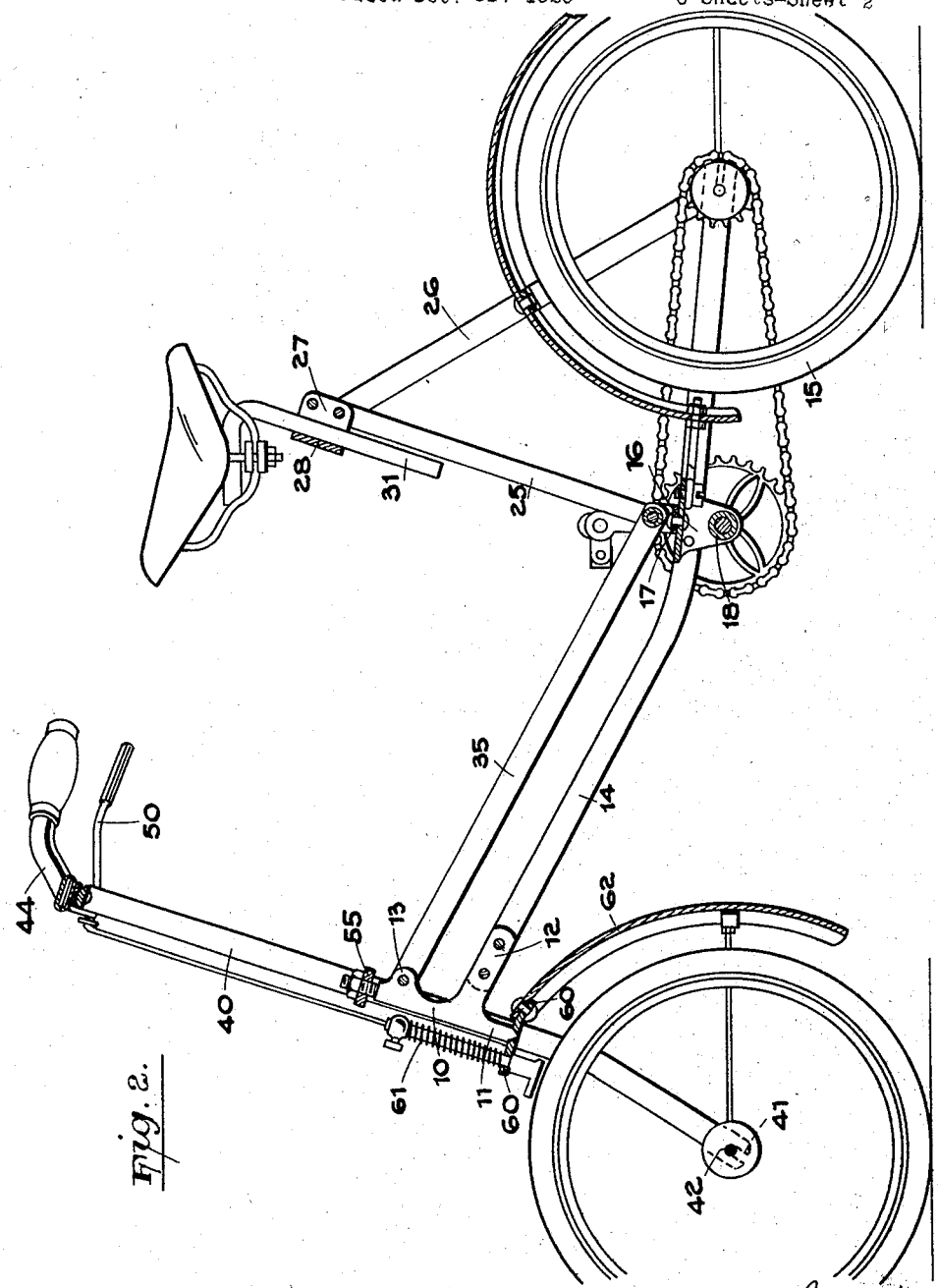

Figure 1 is a side elevation.
Figure 2 is a vertical section.
Figure 3 is a front elevation.
Figure 4 is a transverse section through the central part of the handle bar and of the extension or upper part of the front fork.
Figure 5 is a transverse vertical section of the bottom bracket, and
Figure 6 is a plan view of the saddle clip and upper portion of the saddle support or frame.

As illustrated, the cycle comprises a forward unit which includes a fork for a front wheel, a handle bar, and a frame for connecting said fork and handle bar and pivotally mounted on a head which is rigidly associated with the main frame.

The head 10 is formed from solid metal and has a straight or rod like body portion 11 provided with two integral lugs 12 and 13. Riveted to the lug 12 are a pair of longitudinal members 14 which diverge rearwardly and at their rear ends form a fork for a rear wheel 15. Intermediately of their ends the members 14 are riveted to a bottom bracket which is formed from a pair of U-shaped plates 16 and 17 which have their transverse or web portions riveted together. The lower plate 16, which forms an inverted U, has a tube 18 passed through and secured in holes in the extremities of its flanges so as to form a bearing for the crank shaft which carries the pedals, and by which the rear wheel is rotated in the usual manner.

The flanges of the upper U-shaped plate 17 are connected with a pair of upwardly extending members 25 which, together with a second pair of upwardly extending members 26 having their lower ends engaging with the rear wheel spindle, form the saddle support, and are connected at their upper ends by a clamping bolt. Between the upper ends of these members 25 and 26 are clamped the flanges 27 of a plate 28 which is curved to form a flanged split cylindrical socket for receiving a saddle pillar 31.

Also connected with the flanges of the upper U-shaped plate 17 are the rear extremities of a pair of longitudinal struts 35 which have their forward extremities riveted to the lug 13 on the head 10.

The forward unit of the cycle frame comprises an integral member 40 which is bent into the form of an inverted U and serves at its lower end as a front fork, the extremities of this member 40 being slotted at 41 for receiving the spindle 42 of the front wheel. The transverse portion 43 of the U, or upper end of the member 40, has the handle bar 44 directly secured to it by a pair of rivets 45. The handle bar 44 is of tubular construction and has its central portion reinforced by a liner 46, and the riveted parts of both the handle bar 44 and the liner 46 are flattened. Sandwiched between the flattened part of the handle bar and the transverse part 43 of the member 40 is a plate 47 through which the rivets are passed, and this plate is formed with a lug 48 on which is mounted the fulcrum or pivot 49 of a brake lever 50. The inner end of the lever 50 is connected with a rod which carries at its lower end a tubular extension 51 having a shoe 52 for engaging the tire of the front wheel.

Between the two arms of the member 40 are secured a pair of transverse plates 55, the lower of these plates being provided with a conical bearing recess in the centre of its upper face for receiving a conical bearing face formed on the lower end of the part 11 of the head 10.

The upper plate 55 has a screw threaded hole at its centre for receiving a bolt 56. The lower end of this bolt is formed with a conical recess which is adapted to be engaged with a conical bearing face formed on the upper end of the part 10 of the head. The upper end of the bolt 56 is provided with a screwdriver slot enabling the bolt to be rotated, and the bolt is also provided with a locking nut 57 adapted to be screwed tightly against the plate 40. By this means the front fork unit is pivotally mounted on the head. It will be readily appreciated that if desired the front fork unit can be separated from the main framework by unscrewing the bolt 56, and further the stiffness of the pivotal action of the forward unit can be varied by adjusting the bolt 56.

The lower plate 40 is provided with a pair of integral lugs 60 which extend one forwardly and one rearwardly. The forwardly extending lug 60 is provided with a hole through which the tubular extension of the brake rod passes, thereby forming a guide for the brake rod, and at the same time forming an abutment for engaging one end of a spring 61 which is coiled round the tubular extension and serves to maintain the brake in the disengaged position. The rearwardly extending lug 60 is riveted to the forward extremity of a mudguard 62 which has its lower end supported by stays 63 which are in engagement with the spindle of the front wheel.

In the cycle illustrated the integral U-shaped member 40 is formed of solid metal strip having a D-shaped cross section, and the members 14, 25, 26 and 35 are also formed from similar strip metal. The members may, however, be of any suitable cross section and either solid or tubular.

What I claim then is:—

1. In a velocipede, the combination of a main frame including a fork for a rear wheel; an inverted U-shaped member formed from an integral length of material; a pivotal connection joining the main frame to the inverted U-shaped member intermediately of the ends of the latter; and a handle bar secured directly to the end of the inverted U-shaped member which is above the pivotal connection; the end of the inverted U-shaped member which is below the pivotal connection forming a fork for a front wheel.

2. In a velocipede, the combination of a main frame including a fork for a rear wheel; an inverted U-shaped member formed from an integral length of material; a pivotal connection joining the main frame to the inverted U-shaped member intermediately of the ends of the latter; and a handle bar secured directly to the transverse portion of the inverted U-shaped member; the end of the inverted U-shaped member which is below the pivotal connection forming a fork for a front wheel.

3. In a velocipede, the combination of a main frame including a fork for a rear wheel; an inverted U-shaped member formed from an integral length of material; a pivotal connection joining the main frame to the inverted U-shaped member intermediately of the ends of the latter; a handle bar secured directly to the transverse portion of the inverted U-shaped member; the end of the inverted U-shaped member which is below the pivotal connections forming a fork for a front wheel; and an attachment lug formed as a plate disposed between the handle bar and said transverse portion and secured by the connection between them.

4. In a velocipede, the combination of a main frame including a fork for a rear wheel; an inverted U-shaped member formed from an integral length of material, said inverted U-shaped member forming at its lower end a fork for a front wheel; a tubular handle bar having a flattened part intermediately of its ends; a reinforcing liner within the flattened part of the handle bar; securing members which pass through said reinforced flattened part of the handle bar and through the transverse part of the U-shaped member; and a pivotal connection between the inverted U-shaped member and the main frame.

5. In a velocipede, the combination of a main frame including a fork for a rear wheel; an inverted U-shaped member formed from an integral length of material, said inverted U-shaped member forming at its lower end a fork for a front wheel; a tubular handle bar having a flattened part intermediately of its ends; a reinforcing liner within the flattened part of the handle bar; a plate sandwiched between the flattened part of the handle bar and the transverse part of the U-shaped member, said plate having an attachment lug; securing members which pass through the liner and flattened part of the handle bar, through the plate and through the transverse part of the U-shaped member; and a pivotal connection between the inverted U-shaped member and the main frame.

6. In a velocipede, the combination of a main frame including a fork for a rear wheel; an inverted U-shaped member formed from a single length of material and constituting a fork for a front wheel; a pair of bearings mounted on said U-shaped member between its arms; and a bracket at the front of the main frame having a pair of pivot surfaces for engaging said pair of bearings.

7. In a velocipede, the combination of a main frame including a fork for a rear wheel; an inverted U-shaped member formed from an integral length of material, said inverted U-shaped member forming at its lower end a fork for a front wheel; a pivotal connection between the inverted U-shaped member and the main frame; a pair of transverse bracings connecting the arms of the U-shaped member intermediately of their ends; a pair of bearings associated with said bracings; and a bracket at the front of the main frame having a pair of pivot surfaces for engaging said pair of bracings.

8. In a velocipede, the combination of a main frame including a fork for a rear wheel; an inverted U-shaped member formed from an integral length of material, said inverted U-shaped member forming at its lower end a fork for a front wheel; a handle bar attached to the transverse part of the inverted U-shaped member; a pair of transverse plates connecting the arms of the U-shaped member intermediately of their ends, one of said transverse plates having a tapering recess and the other having a screw threaded hole; a screw threaded member formed with a tapering recess and mounted in said screw threaded hole; and a bracket at the front of the main frame having a pair of tapering pivot projections for engagement with the two tapering recesses.

9. In a velocipede, the combination of a main frame including a fork for a rear wheel; an inverted U-shaped member formed from an integral length of material, said inverted U-shaped member forming at its lower end a fork for a front wheel; a tubular handle bar having a flattened part intermediately of its ends; a plate sandwiched between the flattened part of the handle bar and the transverse part of the U-shaped member, said plate having an attachment lug; securing members which pass through the liner and flattened part of the handle bar, through the plate, and through the transverse part of the U-shaped member; a pair of transverse plates connecting the arms of the U-shaped member intermediately of their ends, one of said transverse plates having a tapering recess and the other having a screw threaded hole; a screw threaded member formed with a tapering recess and mounted in said screw threaded hole; and a bracket at the front of the main frame having a pair of tapering pivot projections for engagement with the two tapering recesses.

In witness whereof I affix my signature.

ERNEST ARNOLD RADNALL.